United States Patent Office 3,217,416
Patented Nov. 16, 1965

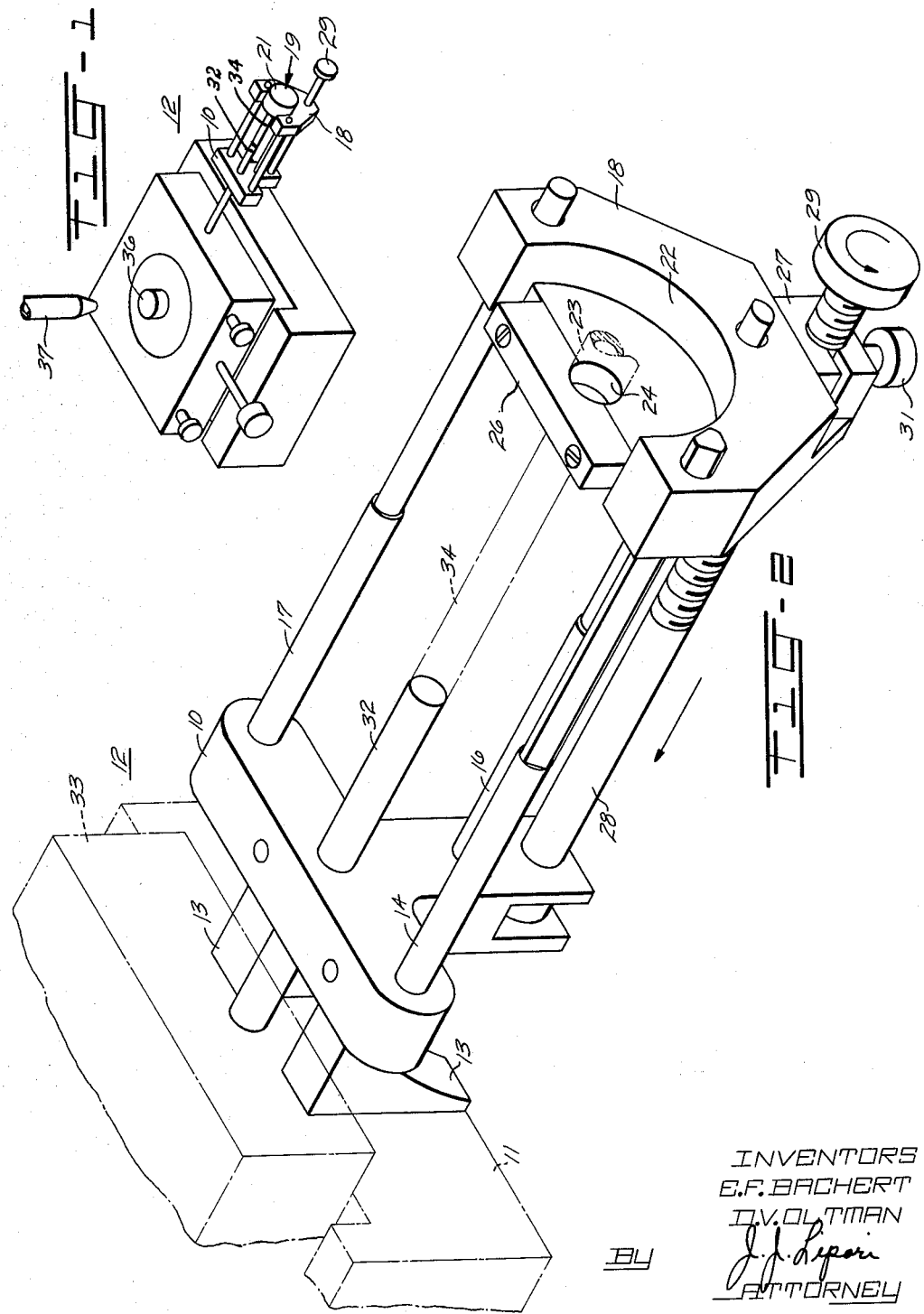

3,217,416
CARRIAGE DISPLACEMENT MEASURING
APPARATUS
Edward F. Bachert, Tamaqua, and David V. Oltman, Perkasie, Pa., assignors to Western Electric Company, Incorporated, New York, N.Y., a corporation of New York
Filed July 6, 1962, Ser. No. 208,054
3 Claims. (Cl. 33—125)

This invention relates to measuring apparatus and particularly to a device for use with a precision measuring instrument to improve the operation thereof.

The device, preferably, is contemplated for use as an adjunct of a conventional measuring instrument, such as a comparator table, which is movable by a micrometer and includes a sighting instrument, such as an optical microscope. Heretofore, to measure a dimension of an object with such an instrument, the object was placed on the comparator table and the table moved by means of the micrometer until one of the points on the object from which measurements or measurements were to be made was brought into focus and coincidence with the intersection of the fine cross hairs or lines of the microscope. The setting of the micrometer was then read and recorded. To complete the measurement, the table was moved by means of the micrometer until the intersection of the cross hairs of the microscope was brought into focus and coincidence with the next point to which measurement was to be made and the setting of the micrometer noted and recorded at this point. The difference obtained between the first and second readings was the measured dimension. Thus, to find a dimension of an object with such an instrument requires two readings, two recordations and a calculation. As a result, the measurement is time consuming and subject to inaccuracy due to errors in calculation.

It is, therefore, the object of this invention to provide a device for use with a measuring instrument to improve the operation thereof.

With this and other objects in mind, the invention contemplates a device for use with a measuring instrument, such as a comparator table, to improve the operation thereof by obviating the necessity of two readings and recordation for each measurement. Generally, this is accomplished by associating the device with the instrument in such a manner that the initial setting of the measuring device used with the instrument, e.g., a micrometer, will be maintained during alignment of an object to be measured to a first point from which measurement or measurements are to be made.

In a preferred embodiment of the invention the device comprises a first member adapted to be associated with a fixed portion of a measuring instrument, such as a comparator table. A second member, which is adapted to receive a measuring device such as a micrometer, is connected to the first member and is mounted for movement with respect thereto by a plurality of rod-like elements, some of which are fixed in the first member and slidably disposed in the second member and at least one of which is adaptable as a driving means for the second member. Slidably disposed in the first member is another rodlike element, one end of which is engageable with the measuring device and the other end of which is engageable with a movable portion of the measuring instrument. In operation, movement of the second member causes movement of the table without disturbing the setting of the measuring device, thereby enabling alignment of an object to be measured without disturbing the initial or zero setting of the measuring device.

The invention will be more readily understood from the detailed description which follows when read in conjunction with the drawings wherein:

FIG. 1 is a view in perspective of the device in association with a measuring instrument shown diagrammatically, and FIG. 2 is an enlarged detailed view in perspective of the device.

Referring now to the drawings, the device depicted therein includes a first member 10 adapted to be attached by means of brackets 13—13 to the bed 11 of a conventional measuring instrument, such as a comparator table, designated generally by the reference numeral 12. Fixed within the first member 10 and extending therefrom are three rod-like elements 14, 16 and 17. Slidable over the elements 14, 16 and 17 and connected thereby to the first member 10 is a second member 18 adapted to receive a measuring device, such as a micrometer, designated generally by the reference numeral 19 and having a head or barrel 21, a spindle 34 and a spindle sleeve 23. More specifically, the member 18 is provided with a hollowed out arcuate portion 22 for receiving the head 21 of the micrometer 19 and with an arcuate portion 24 for receiving the spindle sleeve 23 thereof. A top plate 26 is provided for securing the spindle sleeve 23 and, hence, the micrometer 19 to the member 18.

Journalled in the first member 10 and threadably engaged with a bottom bifurcated plate 27 of the second member 18 is a lead screw 28 rotatable by means of a knurled member 29. Rotation of knurled member 29 causes member 18 to move relative to member 10, the direction of travel of member 18 depending upon the direction of rotation of knurled member 29. For example, assuming a right-hand thread, if knurled member 29 is rotated in a counterclockwise direction, member 18 will move in the direction of the arrow. Conversely, if knurled member 29 is rotated in a clockwise direction, member 18 will move in a direction opposite to that shown by the arrow. The bifurcated portions of bottom plate 27 are movable toward and away from each other by means of a tension screw 31. In this manner, the engagement of the threaded portion of lead screw 28 with the internal threads of member 18 can be controlled for smooth and accurate movement of member 18. As a further aid in assuring accurate and smooth movement of member 18 over elements 14, 16 and 17, these elements are relieved, as shown, to reduce friction and to preclude the possibility of member 18 tilting during its travel. More specifically, the portion of the member 14 slidable in the member 18 is substantially triangular in cross section, the portion of the member 16 slidable in the member 18 is substantially elliptical in cross section with the major axis of the ellipse being vertical, and the portion of the member 17 slidable in the member 18 is substantially elliptical with the major axis of the ellipse being horizontal.

Located within member 10 and disposed for slidable movement therethrough is a rod-like element 32. One end of element 32 is engageable with the carriage 33 of the table 12 and the other end thereof is engageable with the spindle 34 of micrometer 19. Accordingly, when member 18 is moved in the direction of the arrow in FIG. 2, the spindle 34 will cause movement of the element 32 which in turn will cause movement of the carriage 33. Carriage 33, as is well known, is movable against spring pressure; hence, the carriage 33 will follow member 18 in either direction of its travel. Movement of the carriage 33 can also be accomplished by rotation of the micrometer head 21. In this instance, member 18 remains stationary and the spindle 34 moves relative thereto, thus causing movement of element 32.

In operation, the micrometer 19 is secured to member 18 and set to a predetermined value, preferably zero. An object 36, whose dimensions are to be measured, is placed on the comparator table 12, and the table moved by rotation of member 29 until the point on the object 36 from which measurement is to be made is brought into focus and coincidence with the intersection of the fine cross hairs of a microscope 37 associated with the comparator table in a well-known manner. The comparator table 12 is then moved by means of the micrometer 19 until the intersection of the cross hairs of microscope 37 is brought into focus and coincidence with the next point to which measurement is to be made. The reading of the micrometer 19 at this point is the measured dimension.

It is to be understood that the above-described arrangement is simply illustrative of the application of the principles of the invention. Numerous other arrangements may be readily devised by those skilled in the art which will embody the principles of the invention and fall within the spirit and scope thereof.

What is claimed is:

1. Measuring apparatus, which comprises:
   a comparator table having a fixed bed and a movable carriage;
   a first member connected to the bed of said comparator table;
   a second member;
   means for connecting said second member to said first member in a manner such as to permit relative movement between said first and second members;
   a rod slidable in said first member and having one end in driving engagement with said comparator table carriage;
   a micrometer having an individually movable spindle, said micrometer being secured to said second member such that said spindle is colinear with said rod and is in driving engagement with the opposite end thereof; and
   screw means for moving said second member relative to said first member to cause corresponding movement of said comparator table carriage.

2. Measuring apparatus, which comprises:
   a comparator table having a fixed bed and a movable carriage;
   a first member connected to the bed of said comparator table;
   a second member;
   a plurality of connecting rods, each of which has one end fixed in said first member and the other end slidably disposed in said second member to enable movement of said second member towards and away from said first member;
   a carriage driving rod slidable in said first member and having one end in driving engagement with said comparator table carriage;
   a micrometer having an individually movable spindle, said micrometer being secured to said second member such that said spindle is colinear with said carriage driving rod and is in driving engagement with the opposite end thereof; and
   means for moving said second member towards and away from said first member to cause corresponding movement of said comparator table carriage, said means including a partially threaded lead screw, the unthreaded portion of which is journalled in the first member and the threaded portion of which is threadably engaged with the second member.

3. Measuring apparatus, which comprises:
   a comparator table having a fixed bed and a movable carriage;
   a first vertical member having means connected thereto for securing said first member to said comparator table bed;
   a horizontal carriage driving rod slidably supported in said first member and having one end in driving engagement with said comparator table carriage;
   a micrometer having a barrel and an individually movable spindle;
   a second vertical member having an arcuate concave portion for receiving said micrometer barrel such that said micrometer spindle is colinear with said carriage driving rod and is in driving engagement with the opposite end thereof;
   means for releasably securing said micrometer barrel to said second member;
   a plurality of connecting rods, each of which is parallel to said carriage driving rod, and each of which has one end fixed to said first member and the other end slidably disposed in said second member to enable movement of said second member towards and away from said first member, said rods being arranged and constructed such as to assure that the direction of movement of said second member is only along a predetermined straight line path;
   a partially threaded lead screw, the unthreaded portion of which is journalled in the first member and the threaded portion of which is threadably engaged with said second member; and
   a knob connected to said lead screw for rotating the same to cause movement of said second member towards and away from said first member along said predetermined straight line path.

References Cited by the Examiner

UNITED STATES PATENTS

| 325,233 | 9/1885 | Barnes | 33—165 |
| 1,467,403 | 9/1923 | Toomey | 33—170 |
| 1,857,088 | 5/1932 | Parkhurst | 33—125 |
| 2,559,311 | 7/1951 | Meissner | 33—165 X |
| 2,675,624 | 4/1954 | Kristensen | 33—165 X |
| 3,123,917 | 3/1964 | Haluska | 33—170 |

FOREIGN PATENTS

| 518,160 | 12/1920 | France. |
| 961,497 | 11/1949 | France. |

ROBERT B. HULL, *Primary Examiner.*